United States Patent
Deura et al.

(10) Patent No.: US 11,816,517 B2
(45) Date of Patent: Nov. 14, 2023

(54) PRINTER AND NON-TRANSITORY COMPUTER-READABLE RECORDING MEDIUM STORING COMPUTER-READABLE INSTRUCTIONS FOR PRINTER

(71) Applicant: Brother Kogyo Kabushiki Kaisha, Nagoya (JP)

(72) Inventors: Yushi Deura, Nagoya (JP); Haruka Azechi, Nagoya (JP); Wataru Hasegawa, Konan (JP); Shunsuke Minamikawa, Nagoya (JP); Takatsugu Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/059,463

(22) Filed: Nov. 29, 2022

(65) Prior Publication Data

US 2023/0177296 A1  Jun. 8, 2023

(30) Foreign Application Priority Data

Dec. 8, 2021  (JP) ................. 2021-199380

(51) Int. Cl.
   *G06K 15/00*  (2006.01)
   *G06K 15/16*  (2006.01)
(52) U.S. Cl.
   CPC ......... *G06K 15/404* (2013.01); *G06K 15/002* (2013.01); *G06K 15/16* (2013.01)

(58) Field of Classification Search
   None
   See application file for complete search history.

(56) References Cited

U.S. PATENT DOCUMENTS

| 2006/0238777 | A1* | 10/2006 | Anno | H04N 1/33369 358/1.1 |
| 2007/0013959 | A1* | 1/2007 | Miwa | G06K 15/1848 358/1.12 |
| 2008/0008491 | A1* | 1/2008 | Tao | G03G 15/50 399/407 |
| 2010/0328709 | A1* | 12/2010 | Hirako | G03G 15/6508 358/1.15 |

(Continued)

FOREIGN PATENT DOCUMENTS

JP   2021-094784 A   6/2021

*Primary Examiner* — Miya J Cato
*Assistant Examiner* — Pawan Dhingra
(74) *Attorney, Agent, or Firm* — BURR PATENT LAW, PLLC

(57) ABSTRACT

In a case where a first sheet paper having a first size is contained and a second sheet paper having a second size is not contained, a printer sends capability information including first size information indicating that the first size is contained and second size information indicating that the second size is contained to a terminal device. The printer receives image data and selection information indicating that a target size has been selected, and in a case where the selection information indicates that the second size has been selected as the target size, the printer executes the predetermined process on the first sheet paper, and in a case where the selection information indicates that the first size has been selected as the target size, the printer does not execute the predetermined process on the first sheet paper.

12 Claims, 6 Drawing Sheets

(56) References Cited

U.S. PATENT DOCUMENTS

Figure 1:
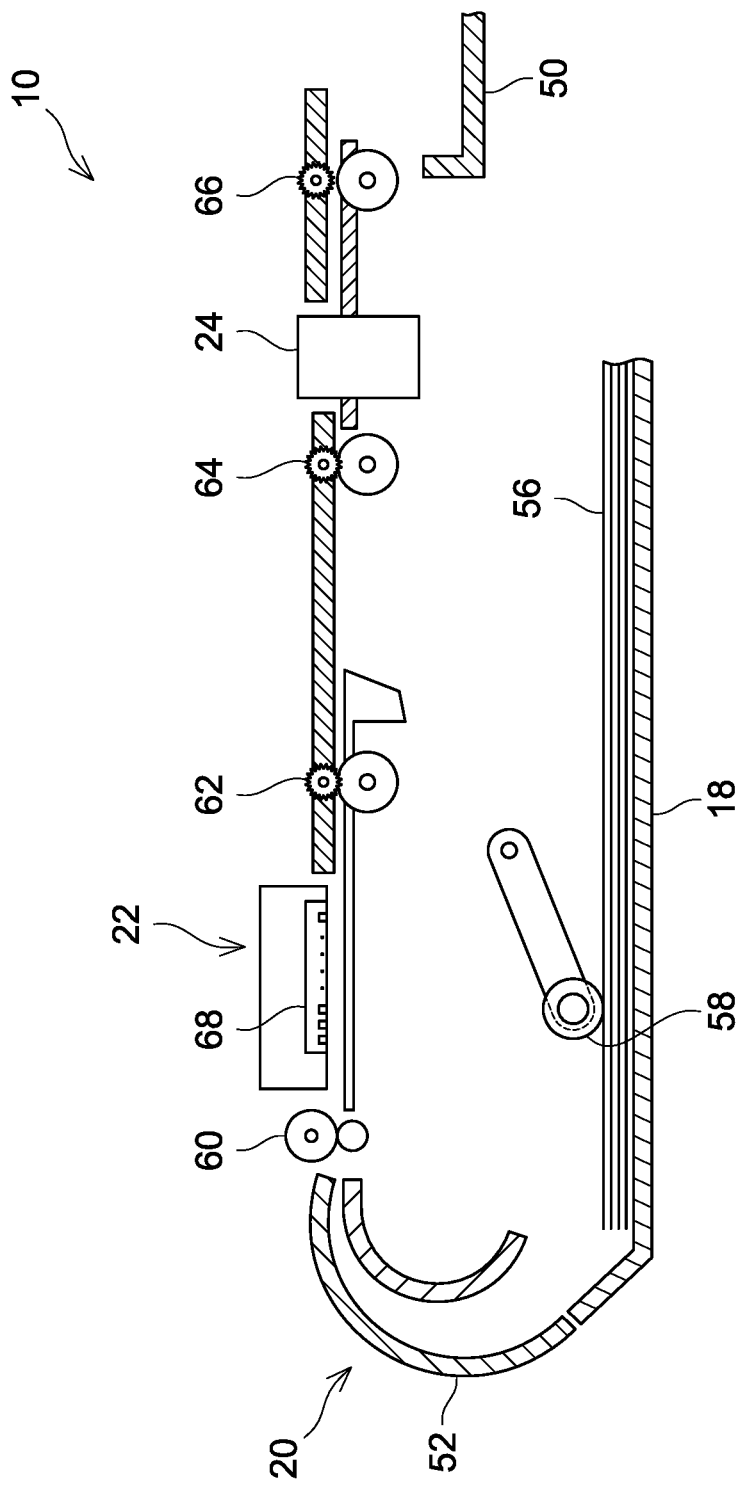

| | | | |
|---|---|---|---|
| 2011/0211211 A1* | 9/2011 | Nakamura | B65H 39/10 |
| | | | 358/1.12 |
| 2013/0094066 A1* | 4/2013 | Sakanashi | H04N 1/1013 |
| | | | 358/449 |
| 2015/0193179 A1* | 7/2015 | Takeshita | G06F 3/1253 |
| | | | 358/1.15 |
| 2017/0280005 A1* | 9/2017 | Matsuda | H04N 1/00973 |
| 2021/0084192 A1* | 3/2021 | Kasuya | G03G 15/502 |
| 2021/0178785 A1* | 6/2021 | Miura | B41J 11/0095 |
| 2023/0030221 A1* | 2/2023 | Ichikawa | G06F 3/1232 |

* cited by examiner

| | PC | Validate-Job req | | Print Result |
| --- | --- | --- | --- | --- |
| | | media-size | media-source | |
| 1 | Size and Tray can be individually selected in print dialog | A4 | tray-1 |  |
| 2 | | A4 | alternate |  |
| 3 | | A5 | tray-1 |  |
| 4 | | A5 | alternate |  |
| 5 | Size and Tray cannot be individually selected in print dialog | A4 | tray-1 |  |
| 6 | | A5 | alternate |  |
| 7 | | A4 | - |  |
| 8 | | A5 | - |  |
| 9 | | - | tray-1 |  |
| 10 | | - | alternate |  |

PRINTER AND NON-TRANSITORY COMPUTER-READABLE RECORDING MEDIUM STORING COMPUTER-READABLE INSTRUCTIONS FOR PRINTER

REFERENCE TO RELATED APPLICATIONS

This application claims priority from Japanese Patent Application No. 2021-199380 filed on Dec. 8, 2021. The entire content of the priority application is incorporated herein by reference.

BACKGROUND ART

A printing device configured to cut a sheet paper is known.

DESCRIPTION

The present teachings disclose a printer configured to switch whether a predetermined process related to cutting a sheet paper is to be executed or not.

A printer disclosed herein may comprise: a container unit configured to contain a sheet paper; a transportation unit configured to transport the sheet paper from the container unit; a print executing unit configured to execute printing on the sheet paper; a process executing unit configured to execute a predetermined process related to cutting of the sheet paper; and a controller. The controller may be configured to: in a case where a first sheet paper having a first size is contained in the container unit and a second sheet paper having a second size smaller than the first size is not contained in the container unit, send capability information including first size information indicating that the first size is contained and second size information indicating that the second size is contained to a terminal device; after the capability information has been sent to the terminal device, receive selection information indicating that a target size which is a size of the sheet paper to be printed has been selected and image data representing an image to be printed, wherein the selection information was sent in response to a user selecting the target size from among a plurality of sizes including the first size indicated by the first size information and the second size indicated by the second size information; in a case where the selection information and the image data are received from the terminal device, cause the transportation unit to transport the first sheet paper and cause the print executing unit to print the image on the first sheet paper regardless of whether the target size is the first size or the second size; and in a case where the selection information indicates that the second size has been selected as the target size, cause the process executing unit to execute the predetermined process to the first sheet paper, wherein in a case where the selection information indicates that the first size has been selected as the target size, the predetermined process is not executed to the first sheet paper.

According to this configuration, in a case where the target size is the second size, the printer executes the predetermined process on the first sheet paper, and in the case where the target size is the first size, the predetermined process is not executed. Due to this, the printer is able to switch whether the predetermined process on the sheet paper is to be executed or not.

A control method for realizing the printer, a computer-readable instructions for the printer, and a non-transitory computer-readable recording medium storing the computer-readable instructions for the printer are novel and useful. Further, a communication system comprising the printer and a terminal device is also novel and useful.

Figure 2:
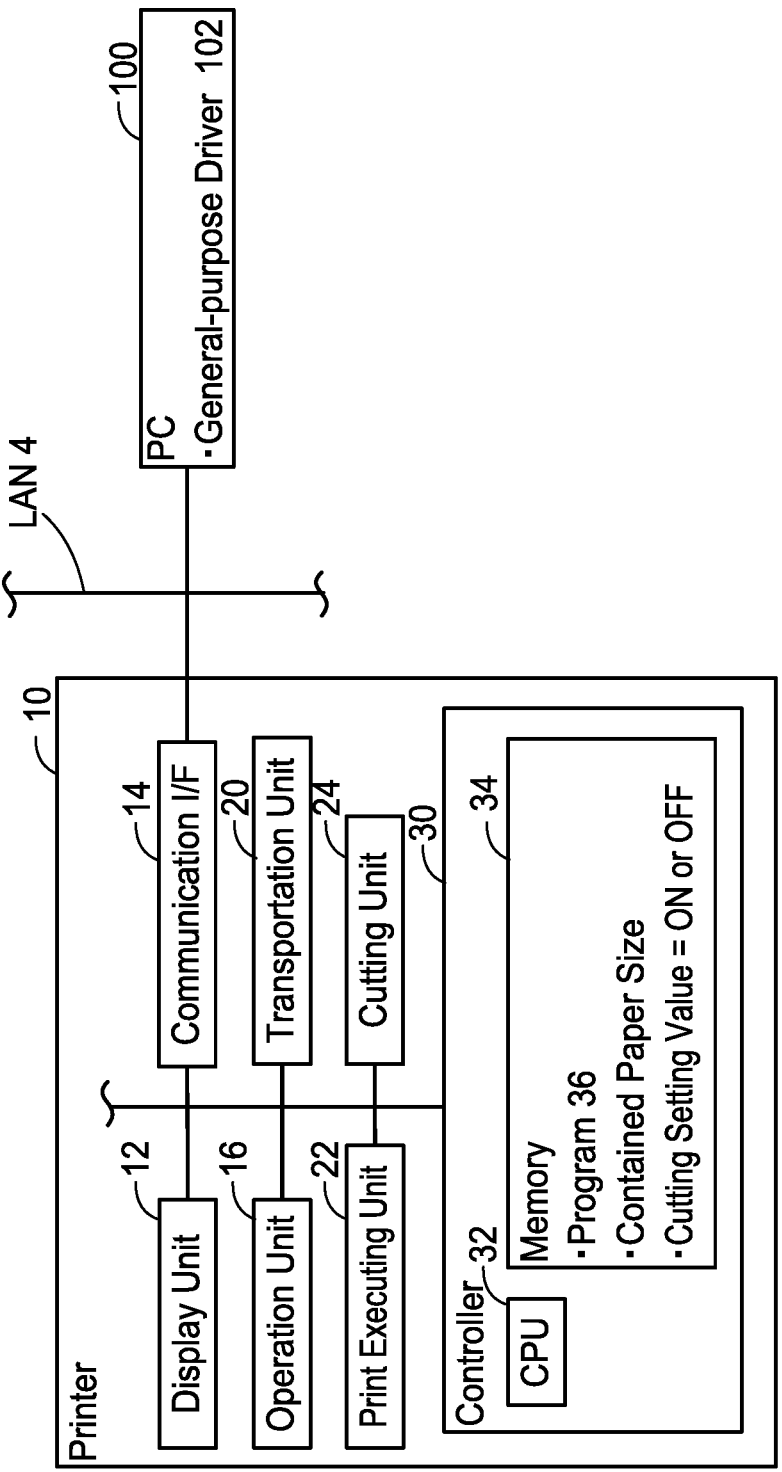
Figure 3:
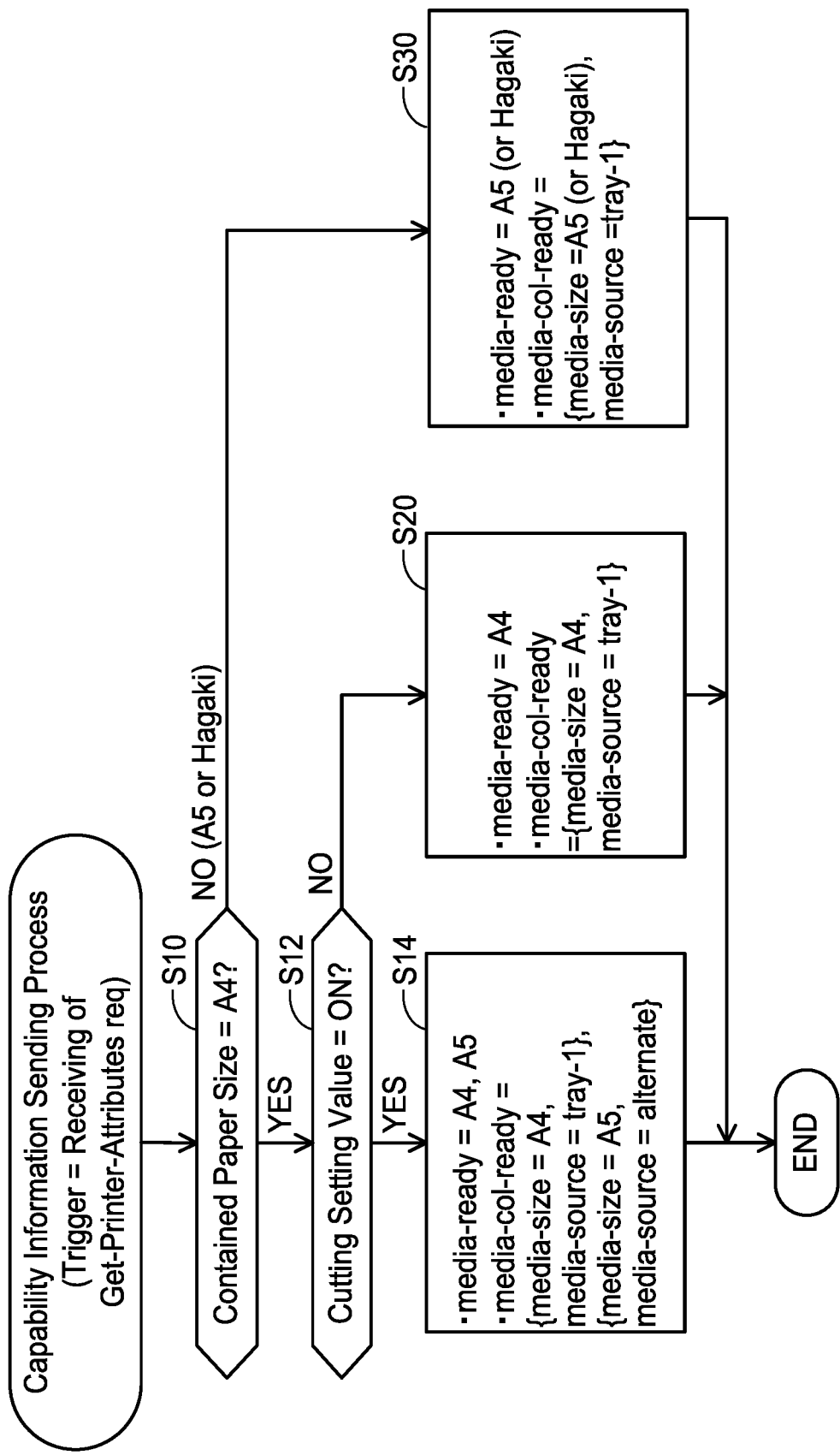
Figure 4:
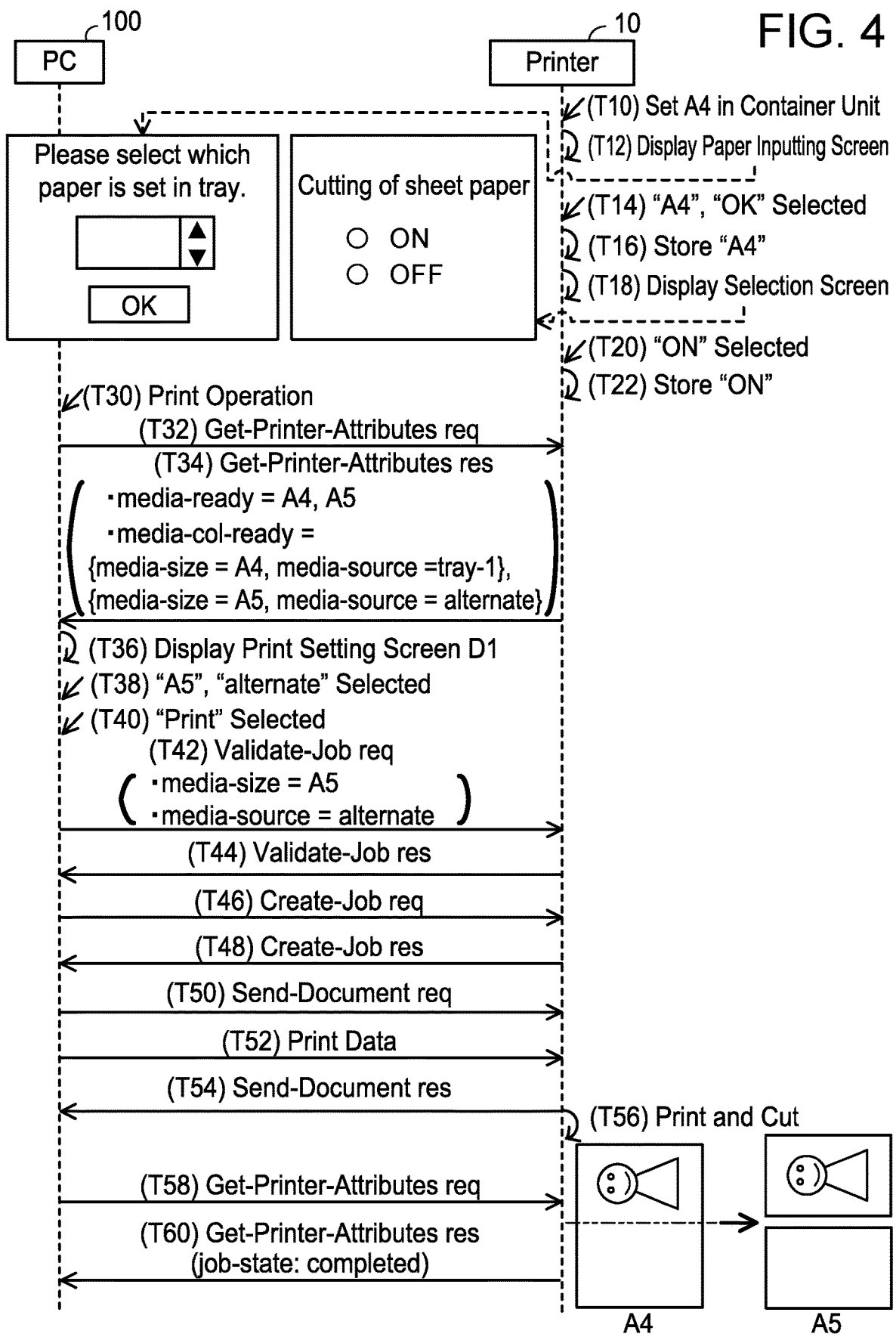
Figure 5:
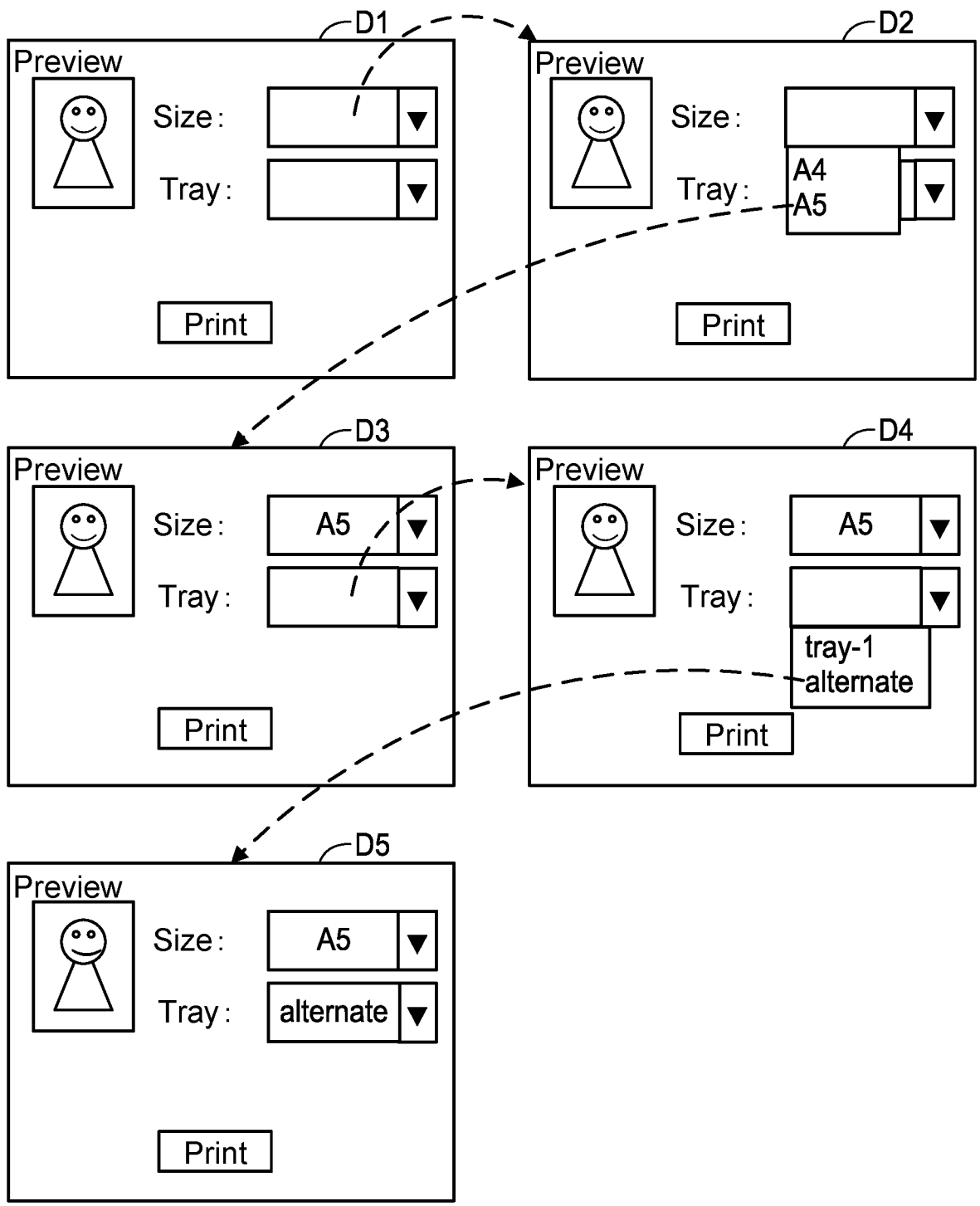
Figure 6:
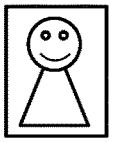
Figure 6:
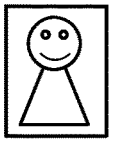
Figure 6:
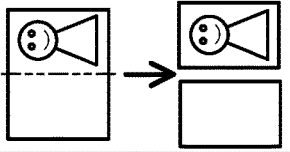
Figure 6:
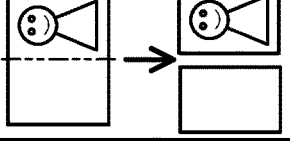
Figure 6:
Figure 6:
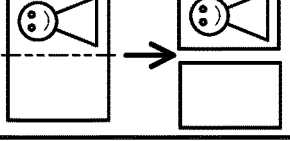
Figure 6:
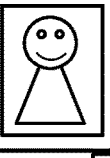
Figure 6:
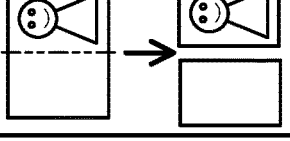
Figure 6:
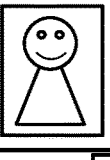
Figure 6:
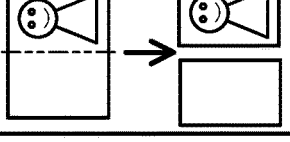

FIG. 1 illustrates a hardware configuration of a printer.
FIG. 2 illustrates a control configuration of the printer.
FIG. 3 illustrates a flowchart of a capability information sending process.
FIG. 4 illustrates a sequence of a specific example.
FIG. 5 illustrates an example of a print setting screen.
FIG. 6 illustrates a table which compiles respective cases.

FIRST EMBODIMENT

Hardware Configuration of Printer 10; FIG. 1

As shown in FIG. 1, a printer 10 comprises a container unit 18, a transport unit 20, a print executing unit 22, a cutting unit 24, and an output tray 50. The container unit 18, the transport unit 20, the print executing unit 22, and the cutting unit 24 are arranged inside a housing (not shown) of the printer 10. The output tray 50 is exposed outside the housing.

The container unit 18 contains sheet papers 56. A "sheet paper" is a paper that is precut in a predetermined size such as A4, A5, letter, and Hagaki (postcard). In the present embodiment, the sheet papers of a size that is one of A4 size, A5 size, and Hagaki are contained in the container unit 18.

The transport unit 20 comprises a transport path 52 and a plurality of rollers 58, 60, 62, 64, 66. Each sheet paper 56 contained in the container unit 18 is transported along the transport path 52 by the rollers 58, etc.

The print executing unit 22 includes an inkjet head 68 in the present embodiment. The inkjet head 68 prints an image on the sheet paper 56 by ejecting ink on the sheet paper 56 transported by the rollers 58, 60. The sheet paper 56 on which printing was executed is further transported downstream in a transport direction by the rollers 62, 64. In a modification, the print executing unit 22 may comprise a printing mechanism of laser method.

The cutting unit 24 includes a cutting blade (not shown). The cutting unit 24 is configured to cut the sheet paper 56 on which printing was executed by the cutting blade moving in a direction perpendicular to sheet surface of FIG. 1. Due to this, the sheet paper 56 is divided into a part upstream and a part downstream in the transport direction. In particular, the cutting unit 24 cuts the sheet paper 56 along a straight line connecting respective middle points of a pair of long sides of the sheet paper 56, by which the sheet paper 56 is cut in half. That is, the cutting unit 24 is able to form two A5-sized sheets as cut by cutting a sheet paper of A4 size in half, for example. The respective sheets of sheet paper 56 as cut are further transported downstream in the transport direction by the rollers 66, etc. Due to this, the respective sheets of sheet paper 56 as cut reach the output tray 50.

Thus, the printer 10 according to the present embodiment is configured to cut the sheet paper 56. Due to this, as long as a user of the printer 10 prepares a sheet paper of A4 size, the user is able to obtain a printed paper having a size smaller than A4 size (e.g., A5 size). For example, even when the user wishes to execute a print on a sheet paper of A5 size although the user does not have any sheet paper of A5 size, the printer 10 is able to provide the sheet paper of A5 size to the user by executing printing on a sheet paper of A4 size and cutting the sheet paper of A4 size.

Control Configuration of Printer 10; FIG. 2

Next, a control configuration of the printer 10 will be described with reference to FIG. 2. A communication system 2 is realized by the printer 10 and a PC 100. The printer 10 and the PC 100 are connected to a local area network (LAN) 4. The printer 10 and the PC 100 are configured to communicate with each other via the LAN 4. The LAN 4 may be a wired LAN, or may be a wireless LAN.

The printer 10 comprises a display unit 12, a communication interface 14, an operation unit 16, the transport unit 20, the print executing unit 22, the cutting unit 24, and a controller 30. Each unit 12 to 30 is connected to a bus line (refence sign omitted).

The display unit 12 is a display configured to display various types of information. The display unit 12 functions as a so-called touch screen. That is, the display unit 12 functions as an operation unit configured to be operated by a user. The communication interface 14 is connected to the LAN 4. The operation unit 16 comprises a plurality of keys. The user is able to input various instructions to the printer 10 by operating the operation unit 16. The rollers 58, etc. of the transport unit 20, the print executing unit 22, and the cutting unit 24 transport the sheet paper 56, print on the sheet paper 56, and cut the sheet paper 56 in accordance with instructions from the controller 30 (that is, a CPU 32 to be described later).

The controller 30 comprises the CPU 32 and a memory 34. The CPU 32 is configured to execute various processes in accordance with a program 36 stored in the memory 34. The memory 34 may be composed of a volatile memory, a non-volatile memory, and/or the like, for example. The memory 34 stores a contained paper size and a cutting setting value besides the above program 36. The contained paper size indicates a size of a sheet paper being contained in the container unit 18. The cutting setting value indicates either "On" indicating that the printer 10 is to cut the sheet paper or "Off" indicating that the printer 10 is not to cut the sheet paper.

Configuration of PC 100

The PC 100 is used by the user of the printer 10. The PC 100 comprises a general-purpose driver 102. The general-purpose driver 102 is a printer driver provided by an entity different from a vendor of the printer 10. The general-purpose driver 102 is different from a printer driver dedicated (that is, dedicated driver) to a given printer, and is configured to cause various types of printers manufactured by plural printer vendors to execute printing. The general-purpose driver 102 may be installed in the PC 100 from a server on the internet (not shown), or may be installed in the PC 100 in advance prior to the shipment of the PC 100. In the present embodiment, the general-purpose driver 102 is a printer driver configured to execute processes in accordance with Internet Printing Protocol (IPP). In a modification, the general-purpose driver 102 may be a printer driver configured to execute processes in accordance with a scheme different from the IPP scheme.

Capability Information Sending Process; FIG. 3

With reference to FIG. 3, a capability information sending process executed by the CPU 32 of the printer 10 will be described. The capability information sending process starts with receiving Get-Printer-Attributes request according to the IPP scheme from the PC 100 as a trigger for the process. Hereinbelow, Get-Printer-Attributes will be referred to as "GPA", and request will be referred to as "req". The GPA req is a command for requesting a printer to send capability information indicating print condition(s) which the printer is able to execute.

In S10, the CPU 32 determines whether the contained paper size stored in the memory 34 (i.e., the size of the sheet paper 56 being contained in the container unit 18) is A4 or not. In a case where the contained paper size is determined to be A4 (YES in S10), the CPU 32 proceeds to S12, and in a case where the contained paper size is determined to be A5 or Hagaki (NO in S10), the CPU 32 proceeds to S30.

In S12, the CPU 32 determines whether the cutting setting value stored in the memory 34 indicates ON or OFF. In a case where the cutting setting value indicates ON (YES in S12), the CPU 32 proceeds to S14, whereas in a case where the cutting setting value indicates OFF (NO in S12), the CPU 32 proceeds to S20.

In S14, the CPU 32 sends GPA response to the PC 100. Hereinbelow, response will be referred to as "res". This GPAres includes information related to media-ready (hereinbelow, "mr"). The mr is information which indicates the size of the sheet paper being contained in the container unit 18. That is, "mr=A4, A5" included in the GPA res of S14 indicates that the sheet paper of A4 size and the sheet paper of A5 size are contained in the container unit 18. However, in the container unit 18 in actuality, the sheet paper of A4 size is contained, but the sheet paper of A5 size is not contained (YES in S10). That is, the CPU 32 notifies the PC 100 of not only the information of A4 size which is actually contained but also the information of A5 size which is actually not contained. Alternatively in a variant, the information indicating the size of the sheet paper contained in the container unit 18 may be sent as media-col-ready.

The GPA res of S14 further includes information related to media-col-ready (hereinbelow "mcr"). The mcr includes related information in which the size of the sheet paper contained in the container unit 18 (i.e., "media-size") and name information which is a name of the container unit 18 (i.e., "media-source") are associated with each other. In particular, the mcr included in the GPA res of S14 includes two pieces of the related information. One piece of the related information is information in which the size of the sheet paper "media-size=A4" and name information "media-source=tray-1" are associated with each other. "tray-1" is an actual name of the container unit 18. The other piece of the related information is information in which the size of the sheet paper "media-size=A5" and name information "media-source=alternate" are associated with each other. "alternate" is a virtual name which does not actually exist in the printer 10. "tray-1" and "alternate" are names defined by the Printer Working Group Media Standardized Names 2.0 (PWG MSN 2.0). Specifically, in PWG MSN 2.0, "tray-1" to "tray-20" are defined, and "tray-1" is usually used for a printer which has a single container unit. Also, usually, "alternate" is used as a name for a bypass tray. Thus, because the GPA res includes the mcr, the user is able to know the actual name of the container unit 18 and the name of the virtual container unit in a print setting screen to be described later.

In a modification, the name of the virtual container unit may be another name defined by PWG MSN 2.0. For example, the name of the virtual container unit may be "tray-20" which is not used by a standard printer. Further, for example, the name of the virtual container unit may be a name which is not defined by PWG MSN 2.0. The name of the virtual container unit may be any name determined by a vendor of the printer 10, and may specifically be "virtual". In this case, the user is able to easily acknowledge that it is a virtual name in the print setting screen. When S14 is completed, the processes of FIG. 3 are completed.

In S20, the CPU 32 sends GPA res which includes "mr=A4" and "mcr={media-size=A4, media-source=tray-1}" to the PC 100. That is, this GPA res does not include information related to the size "A5" of the sheet paper. When S20 is completed, the processes of FIG. 3 are completed.

In S30, in a case where the contained paper size is A5, the CPU 32 sends GPA res including "mr=A5" and "mcr={media-size=A5, media-source=tray-1}" to the PC 100. That is, in this case, this GPA res does not include information related to the size "A4" of the sheet paper. Due to this, the user is able to appropriately select the size "A5" of the sheet paper which is actually contained and/or the name "tray-1" of the container unit 18 which actually exists in the print setting screen to be described below. In a case where the contained paper size is Hagaki, the CPU 32 sends GPA res including "mr=Hagaki" and "mcr={media-size=Hagaki, media-source=tray-1}" to the PC 100. That is, in this case, this GPA res does not include information related to the size "A4 of the sheet paper nor information related to the size "A5" of the sheet paper. Due to this, the user is able to appropriately select the size "Hagaki" of the sheet paper which is actually contained and/or the name "tray-1" of the container unit 18 which actually exists in the print setting screen to be described below. When S30 is completed, the processes of FIG. 3 are completed.

Specific Cases; FIG. 4 and FIG. 5

With reference to FIG. 4 and FIG. 5, a specific case implemented by the processes of FIG. 3 will be described. In the present case, the user sets the sheet paper 56 of A4 size in the container unit 18 of the printer 10 (i.e., tray-1) in T10.

When the printer 10 (i.e., CPU 32) accepts the sheet paper 56 set in T10, the printer 10 displays a paper inputting screen on the display unit 12 in T12. The paper inputting screen includes a message for inquiring the user about the size of the sheet paper set in the container unit 18 (i.e., tray-1), a box for selecting the contained paper size, and an OK button. The printer 10 accepts selection of the contained paper size "A4" and selection of the OK button in T14, and stores the contained paper size "A4" in the memory 34 in T16. In a modification, the printer 10 may comprise a sensor configured to detect the contained paper size. In this case, the user does not need to select which size the contained paper size is.

Subsequently, in the case where the contained paper size is "A4", the printer 10 displays a selection screen for allowing the user to select whether to cut the sheet paper in T18. The user selects cutting "On" included in the selection screen in T20. In this case, the printer 10 stores the cutting setting value "On" in the memory 34 in T22. Thus, the user is able to select whether to cut the sheet paper. Here, in a case where the contained paper size is "A5" or "Hagaki", the printer 10 does not display the selection screen of T18. This is because the printer 10 is configured not to cut the sheet paper of these sizes.

The user performs a print operation on the PC 100 in T30. The print operation comprises an operation of selecting image data representing an image to be printed and an operation of activating the general-purpose driver 102. Due to this, respective following processes are executed by the general-purpose driver 102. When the PC 100 accepts the print operation from the user in T30, the PC 100 sends GPA req to the printer 10 in T32.

When the GPA req is received from the PC 100 in T32 (i.e., trigger for the processes of FIG. 3), the printer 10 determines that the contained paper size stored in the memory 34 is "A4" (YES in S10) and determines that the cutting setting value stored in the memory 34 is "On" (YES in S12). The printer 10 then sends GPA res to the PC 100 in T34 (S14). This GPA res includes the information related to the size "A4" of the sheet paper being actually contained and the information related to the size "A5" of the sheet paper actually not contained.

When the PC 100 receives the GPA res from the printer 10 in T34, the PC 100 displays a print setting screen D1 in T36. As shown in FIG. 5, the print setting screen D1 includes a preview screen showing an image to be printed, a size selection box for selecting the size of the sheet paper to be printed, a tray selection box for selecting a tray to be used for printing (i.e., container unit), and a Print button.

When the PC 100 receives a selection for pull-down in the size selection box, the PC 100 displays two choices "A4" and "A5" indicated by "mr=A4, A5" included in the GPA res of T34 (see screen D2 of FIG. 5). Then, when the PC 100 accepts selection of the size "A5" in T38, the PC 100 displays "A5" in the size selection box as shown in a screen D3.

Subsequently, when the PC 100 accepts a selection for pull-down in the tray selection box, the PC 100 displays two choices "tray-1" and "alternate" indicated by "mcr={media-size=A4, media-source=tray-1}, {media-size=A5, media-source=alternate}" included in the GPA res of T34 (see a screen D4). Then, when the PC 100 accepts selection of the tray "alternate" in T38, the PC 100 displays "alternate" in the tray selection box as shown in a screen D5.

Thereafter, when the PC 100 accepts the Print button in the screen D5 in T40, the PC 100 sends Validate-Job req including the selected "media-size=A5" and the selected "media-source=alternate" to the printer 10 in T42.

When the printer 10 receives the Validate-Job req according to the IPP scheme in T42, the printer 10 sends Validate-Job res to the PC 10 in T44. As a result of this, the printer 10 receives Create-Job req according to the IPP scheme from the PC 100 in T46, and sends Create-Job res to the PC 100 in T48.

When the PC 100 receives the Create-Job res from the printer 10 in T48, the PC 100 converts the image data to be printed and generates print data having a data format which can be interpreted by the printer 10. The image represented by the print data has a size corresponding to the "media-size=A5" included in the Validate-Job req. Then the PC 100 sends Send-Document req according to the IPP scheme to the printer 10 in T50, and sends the print data to the printer 10 in T52.

The printer 10 receives Send-Document req from the PC 100 in T50, and receives the print data from the PC 100 in T52. In this case, the printer 10 sends Send-Document res in T54, and executes a printing process in T56.

In the printing process of T56, the printer 10 firstly activates the rollers 58, 60 of the transport unit 20 and transports the sheet paper 56 of A4 size contained in the container unit 18 to the print executing unit 22. Here, the sheet paper 56 of A4 size is transported along a direction in which its long sides extend. Then, the printer 10 creates a rotated image by rotating the image represented by the print data by 90 degrees and instructs the print executing unit 22 to print the rotated image. Due to this, the print executing unit 22 prints the rotated image on a downstream half region of the A4-sized sheet paper 56 (i.e., half part downstream in the transport direction). That is, nothing is printed on an upstream half region of the A4-sized sheet paper 56 (i.e., half part upstream in the transport direction).

Subsequently, the printer 10 activates the respective rollers 60, 62, 64 of the transport unit 20 to transport the A4-sized printed sheet paper 56 to the cutting unit 24. Then, the CPU 32 instructs the cutting unit 24 to cut the A4-sized printed sheet paper 56. Due to this, the cutting unit 24 cuts the A4-sized printed sheet paper 56 at a boundary between a downstream half region and an upstream half region. That is, the cutting unit 24 cuts the sheet paper 56 along a straight line connecting respective middle points of a pair of long sides of the sheet paper 56, by which the sheet paper 56 is cut in half. As a result, a cut sheet paper on which the rotated image is printed and a cut sheet paper on which no image is printed are formed. Each of the two cut sheets has a size indicated by the above-mentioned media-size (i.e., A5).

Subsequently, the printer 10 activates the respective rollers 64 and 66 of the transport unit 20 to transport the two sheet papers as cut to the output tray 50. Due to this, the two sheet papers as cut are supplied to the user.

When the printer 10 receives Get-Printer-Attributes req from the PC 100 in T58, the printer 10 sends Get-Printer-Attributes res including Job-state "completed" indicating that the printing process has completed to the PC 100 in T60.

In the present embodiment, the PC 100 comprises a general-purpose driver 102, not a dedicated driver. If the PC 100 comprises a dedicated driver dedicated for the printer 10 being configured to cut sheet paper, the PC 100 is able to allow the user to select whether to cut the sheet paper in the print setting screen. However, it is difficult for the general-purpose driver 102 to allow the user to make such selection. Since printers configured to cut (sheets of) sheet paper have not been widely known, it is highly not likely that setting items for conducting such selection are provided in its print setting screen. Accordingly, the printer 10 does not receive a cutting request command for instructing to cut the sheet paper from the PC 100 comprising the general-purpose driver 102.

The printer 10 is able to switch whether to cause the cutting unit 24 to cut the sheet paper 56 even when the cutting request command is not received from the PC 100. Specifically, in a case where the printer 10 receives the GPA req from the PC 100, the printer 10 sends GPA res including the information of the A4-sized sheet paper being actually contained and the information of the A5-sized sheet paper actually not contained as the capability information to the PC 100 (S14 of FIG. 3, T34 of FIG. 4). The PC 100 then displays the print setting screen D1 including choices complying with the capability information (T34 of FIG. 4).

When the user does not wish to cut the sheet paper, the user may select the paper size "A4" and the tray "tray-1". In this case, the printer 10 determines that the sheet paper is not to be cut in response to receiving the Validate-Job req including "media-size=A4" and "media-source=tray-1" in T42, and thus does not cut the sheet paper. Also, when the user wishes the sheet paper to be cut, the user may select the paper size "A5" and the tray "alternate". In this case, the printer 10 determines that the cutting of the sheet paper is to be performed due to receiving the Validate-Job req including "media-size=A5" and "media-source=alternate" in T42, and thus cuts the sheet paper. As such, even when the printer 10 does not receive the cutting request command from the PC 100, the printer 10 is able to switch whether to cut the sheet paper or not.

Next, a case where the contained paper size of the sheet paper 56 contained in the container unit 18 of the printer 10 is not A4 size but A5 size or Hagaki size (i.e., NO in S10 of FIG. 3) will be described.

In the case where the contained paper size is A5 size, the printer 10 sends GPA res including the information related to A5 size of S30 of FIG. 3 to the PC 100 in T34. When the PC 100 receives this GPA res from the printer 10 in T34, the PC 100 displays the print setting screen in T36. In the size selection box in this print setting screen, only one choice "A5" indicated by "mr=A5" included in the GPA res is displayed. Accordingly, the user can select the size "A5" only. Further, in the tray selection box in the same print setting screen, only one choice "tray-1" indicated by "mcr={media-size=A5, media-source=tray-1}" included in the GPA res is displayed. Accordingly, the user can select the tray "tray-1" only. Due to this, the PC 100 sends Validate-Job req including "media-size=A5" and "media-source=tray-1" to the printer 10 in T42. As a result of this, the printer 10 prints an image of A5 size on the A5-sized sheet paper contained in the container unit 18 in T56, and does not cut the sheet paper.

In the case where the contained paper size is Hagaki size, the printer 10 sends GPA res including information related to Hagaki size in S30 of FIG. 3 to the PC 100 in T34. When the PC 100 receives this GPA res from the printer 10 in T34, the PC 100 displays the print setting screen in T36. In the size selection box of this print setting screen, only one choice "Hagaki" indicated by "mr=Hagaki" included in the GPA res is displayed. Accordingly, the user can select the size "Hagaki" only. Further, in the tray selection box in the same print setting screen, only one choice "tray-1" indicated by "mcr={media-size=Hagaki, media-source=tray-1}" included in the GPA res is displayed. Accordingly, the user can select the tray "tray-1" only. Due to this, the PC 100 sends Validate-Job req including "media-size=Hagaki" and "media-source=tray-1" to the printer 10 in T42. As a result of this, the printer 10 prints an image of Hagaki size on the Hagaki-sized sheet paper contained in the container unit 18 in T56, and does not cut the sheet paper.

As mentioned above, the printer 10 is configured not to cut the sheet paper in the case where the printer 10 contains the A5 size or Hagaki size. This is because it is not likely that the user wishes the sheet paper of A5 size or Hagaki size to be cut. Accordingly, in the case where the printer 10 contains the A5 size or Hagaki size, the printer 10 sends GPA res including the information related to A5 size or the information related to Hagaki size as the capability information to the PC 100. This lessens the number of choices displayed on the print setting screen, as a result of which the user is able to easily select an appropriate print setting according to the size of the sheet paper "A5" or "Hagaki" being actually contained.

Next, a case where the contained paper size of the sheet paper 56 being contained in the container unit 18 of the printer 10 is A4 size and the cutting setting value "Off" is stored in the memory 34 will be described.

The printer 10 sends GPA res including the information of S20 of FIG. 3 to the PC 100 in T34. When the PC 100 receives this GPA res in T34, the PC 100 displays the print setting screen in T36. In the size selection box in this print setting screen, only one choice "A4" indicated by "mr=A4" included in the GPA res of T34 is displayed. Accordingly, the user can select the size "A4" only. Further, in the tray selection box in the same print setting screen, only one choice "tray-1" indicated by "mcr={media-size=A4, media-source=tray-1}" included in the GPA res of T34 is displayed.

Accordingly, the user can select the tray "tray-1" only. Due to this, the PC 100 sends Validate-Job req including "media-size=A4" and "media-source=tray-1" to the printer 10 in T42. As a result of this, the printer 10 prints an A4-sized image on the A4-sized sheet paper contained in the container unit 18 in T56, and does not cut the sheet paper.

As mentioned above, the printer 10 is configured not to cut the sheet paper in the case where the cutting setting value as selected by the user is Off. Since whether to cut the sheet paper or not can be switched depending on user's intention, user convenience is improved. Especially in the case where the cutting setting value is Off, the printer 10 sends GPA res which does not include the information related to A5 size actually not contained as the capability information to the PC 100. This lessens the number of choices displayed on the print setting screen, as a result of which the user is able to easily select an appropriate print setting according to the size "A4" of the sheet paper being actually contained.

Correspondence Relationship

The cutting unit 24 is an example of "process executing unit". A4 size, A5 size, Hagaki size are respectively an example of "first size", "second size", "third size". "media-ready=A4", "media-ready=A5", "media-ready=Hagaki", "GPA res" are respectively an example of "first size information", "second size information", "third size information", "capability information". The PC 100 is an example of "terminal device". Validate job req, print data are respectively an example of "selection information", "image data". {media-size=A4, media-source=tray-1} in mcr, {media-size=A5, media-source=alternate} in mcr are respectively an example of "first related information", "second related information". "media-source=tray-1", "media-source=alternate" are respectively an example of "first name information", "second name information".

S14, S20, S30 of FIGS. 3 and T34 of FIG. 4 are an example of "send capability information". T42, T52 of FIG. 4 is an example of "receive image data representing an image to be printed and selection information". T56 of FIG. 4 is an example of "cause the transportation unit to transport the first sheet paper and cause the print executing unit to print the image on the first sheet paper" and "cause the process executing unit to execute the predetermined process". T18 of FIG. 4 is an example of "cause the display unit to display a selection screen".

Various Cases; FIG. 6

FIG. 6 shows formats of the print setting screen displayed on the PC 100 and various print results implemented by combinations of media-size and media-source included in Validate-Job req in the situation where the printer 10 contains the A4-sized sheet paper. The format of the print setting screen displayed on the PC 100 depends on the general-purpose driver 102 of the PC 100. For example, the general-purpose driver 102 of the present embodiment is configured to display the print setting screen D1 including both the size selection box and the tray selection box. Due to this, the user is able to select respectively each of the size of the sheet paper to be printed and the tray in which this sheet paper is contained (i.e., container unit) in the print setting screen D1. Alternatively, a general-purpose driver different from the general-purpose driver 102 according to the present embodiment may be installed on the PC 100. Then, this different general-purpose driver may be configured to display a print setting screen including the size selection box only, or also may be configured to display a print setting screen including the tray selection box only. That is, general-purpose drivers may comprise a first general-purpose driver configured to display the print setting screen D1 including both the size selection box and the tray selection box as in the present embodiment, a second general-purpose driver configured to display the print setting screen including the size selection box only, and a third general-purpose driver configured to display the print setting screen including the tray selection box only.

The first general-purpose driver sends Validate-Job req including information of the selected size (i.e., "media-size") and information of the selected tray (i.e., "media-source") to the printer 10. In this case, the printer 10 performs printing in accordance with any one of numbers 1 to 4 of FIG. 6.

The second general-purpose driver may send Validate-Job req including information of the selected size and information of the tray associated with the size in mcr to the printer 10. In this case, the printer 10 performs printing in accordance with any of numbers 5, 6 of FIG. 6. Further, the second general-purpose driver may send Validate-Job req including information of the selected size only (i.e., not including information of any tray) to the printer 10. In this case, the printer 10 performs printing in accordance with any of numbers 7, 8 of FIG. 6.

The third general-purpose driver may send Validate-Job req including information of the selected tray and information of the size associated with the tray in mcr to the printer 10. In this case, the printer 10 performs printing in accordance with any of numbers 5, 6 of FIG. 6. Further, the third general-purpose driver may send Validate-Job req including information of the selected tray only (i.e., not including information of any size) to the printer 10. In this case, the printer 10 performs printing in accordance with any of numbers 9, 10 of FIG. 6.

Details of cases of the numbers 1 to 10 will be described. In the case of number 1, Validate-Job req includes "media-size=A4" and "media-source=tray-1". In this case, the print data has a size corresponding to A4 size. The printer 10 prints an A4-sized image represented by the print data on the sheet paper of A4 size and does not cut the sheet paper.

In the case of number 2, Validate-Job req includes "media-size=A4" and "media-source=alternate". This case is a case where although the user had selected the size "A4" of the sheet paper being contained in the container unit 18 in the print setting screen, the user selected a different name other than the name of the container unit 18 "tray-1". In this case, it is likely that the user does not wish the sheet paper of A4 size to be cut because the user knows that A4 size is contained in the printer 10 and also the user selected the A4 size. Due to this, the printer 10 prints the A4-sized image represented by the print data on the A4-sized sheet paper and does not cut the sheet paper, similar to the case of number 1, without considering that the virtual container unit has been selected.

In the case of number 3, Validate-Job req includes "media-size=A5" and "media-source=tray-1". This case is a case where although the user had selected the name of the container unit 18 "tray-1" which actually exists in the print setting screen, the user selected the size "A5" of the sheet paper being not contained in this container unit 18. In this case, it is likely that the user wishes the sheet paper of A4 size to be cut because the user knows that A4 size is contained in the printer 10 but the user selected A5 size anyway. Due to this, the printer 10 prints the A5-sized image represented by the print data on the A4-sized sheet paper and cuts the sheet paper.

In the case of number 4, Validate-Job req includes "media-size=A5" and "media-source=alternate". That is, this case corresponds to FIG. 4. In this case also, it is likely that the user wishes the sheet paper of A4 size to be cut because the user knows that A4 size is contained in the printer 10 but the user selected A5 size anyway, similar to the case of number 3. Due to this, the printer 10 prints the A5-sized image represented by the print data on the A4-sized sheet paper and cuts the sheet paper, similar to the case of number 3.

In the case of number 5, Validate-Job req includes "media-size=A4" and "media-source=tray-1". This is the same as the case of number 1. In this case, the printer 10 prints the A4-sized image represented by the print data on the A4-sized sheet paper and does not cut the sheet paper, similar to the case of number 1.

In the case of number 6, Validate-Job req includes "media-size=A5" and "media-source=alternate". This is the same as the case of number 4. In this case, the printer 10 prints the A5-sized image represented by the print data on the A4-sized sheet paper and cuts the sheet paper, similar to the case of number 4.

In the case of number 7, Validate-Job req includes "media-size=A4" only. In this case, it is likely that the user does not wish the sheet paper of A4 size to be cut. Due to this, the printer 10 prints an A4-sized image represented by the print data on the A4-sized sheet paper and does not cut the sheet paper, similar to the case of number 1.

In the case of number 8, Validate-Job req includes "media-size=A5" only. In this case, it is likely that the user wishes the sheet paper of A4 size to be cut. Due to this, the printer 10 prints an A5-sized image represented by the print data on the A4-sized sheet paper and cuts the sheet paper, similar to the case of number 4.

In the case of number 9, Validate-Job req includes "media-source=tray-1" only. In this case, it is likely that the user does not wish the sheet paper of A4 size to be cut because the user selected the name of the container unit 18 "tray-1" in which A4 size is contained. Due to this, the printer 10 prints an A4-sized image represented by the print data on the A4-sized sheet paper and does not cut the sheet paper, similar to the case of number 1.

In the case of number 10, Validate-Job req includes "media-source=alternate" only. In this case, it is likely that the user wishes the sheet paper of A4 size to be cut because the user selected the name of the virtual container unit "alternate" which is different from the container unit 18 in which A4 size is contained. Due to this, the printer 10 prints an A5-sized image represented by the print data on the A4-sized sheet paper and does not cut the sheet paper, similar to the case of number 4.

As such, the printer 10 is able to perform printing in accordance with user's intention and appropriately switch whether to cut the sheet paper even in the case where Validate-Job req includes both "media-size" and "media-source" (numbers 1 to 6 as above) and also in the case where Validate-Job req includes one of "media-size" and "media-source" (numbers 7 to 10 as above). In a modification, in the cases of numbers 2 and 3, since the tray does not match for the size selected by the user, the printer 10 may not perform printing but display an error.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) Although in the above embodiments, the sheet paper is cut after the printing has been conducted on the sheet paper, in a modification, the printing may be conducted after the sheet paper has been cut.

(Modification 2) Although in the above embodiments, GPA includes "mr" and "mcr, instead of this, GPA may include "mr" only. In this case, in T36 of FIG. 4, the print setting screen which does not include the tray selection box is displayed, and in T42, Validate job req which does not include "media-source" but includes only "media-size" is received. The printer 10 then performs printing according to "media-size" or printing and cutting according to "media-size". Generally speaking, the "capability information" simply needs to include "first size information" and "second size information" and may not include "first related information" and "second related information".

(Modification 3) The printer 10 may not display the selection screen. For example, whether to cut the sheet paper may be selected by the user operating a physical switch arranged on/in the printer 10. In another modification, whether to cut the sheet paper may be selected by the user attaching/removing a cutting mechanism to/from the printer 10. In another modification, whether to cut the sheet paper may be selected in a way that the printer 10 has a web server function, and the user accesses the web server in the printer 10 and selects whether to cut the sheet paper in a selection screen displayed on the PC 100 by operating the PC 100. In the present modification, "display unit" and "cause the display unit to display a selection screen" may be omitted. In another modification, the PC 100 may not allow the user to select whether to cut the sheet paper. That is, the printer 10 may be configured to inevitably send capability information indicating A4 size and A5 size in the case where it contains the sheet paper of A4 size.

(Modification 4) The first size may be A3 and the second size may be A5. In this case, the printer 10 receives print data representing an A5-sized image. The printer 10 prints the image onto a quarter area of the sheet paper of A3 size without rotating the image, and cuts the A3-sized sheet paper into one fourth the original size. Generally speaking, "second size" may not be half the size of "first size". Further, "controller" may not be configured to "generate a rotated image". Further, "controller" may not be configured to "cause the print executing unit to print the rotated image".

(Modification 5) The printer 10 may comprise a perforating unit configured to perforate a sheet paper instead of the cutting unit 24. With perforations created in the sheet paper, the user can easily cut the sheet paper along the perforations. In another modification, the printer 10 may comprise a creasing unit configured to crease the sheet paper instead of the cutting unit 24. With a crease created on the sheet paper, the user can easily cut the sheet paper along the creases. Generally speaking, the "predetermined process" may be any process which is related to cutting of the sheet paper.

(Modification 6) The PC 100 may not comprise the general-purpose driver 102. In this case, the PC 100 comprises a dedicated driver instead of the general-purpose driver 102. The dedicated driver is a printer driver dedicated for a certain printer.

(Modification 7) Although in the above embodiments each process in FIG. 3 to FIG. 6 is implemented by a software, but at least one of those processes may be implemented by hardware such as a logic circuit.

What is claimed is:

1. A printer comprising:
   a container unit configured to contain a sheet paper;
   a transportation unit configured to transport the sheet paper from the container unit;
   a print executing unit configured to execute printing on the sheet paper;
   a process executing unit configured to execute a predetermined process related to cutting the sheet paper; and
   a controller,
   wherein the controller is configured to:
   in a case where a first sheet paper having a first size is contained in the container unit and a second sheet paper having a second size smaller than the first size is not contained in the container unit, send capability information including first size information indicating that the first size is contained and second size information indicating that the second size is contained to a terminal device;
   after the capability information has been sent to the terminal device, receive image data representing an image to be printed and selection information indicating that a target size which is a size of the sheet paper to be printed has been selected, wherein the selection information was sent in response to a user selecting the target size from among a plurality of sizes including the first size indicated by the first size information and the second size indicated by the second size information;
   in a case where the selection information and the image data are received from the terminal device, cause the transportation unit to transport the first sheet paper and cause the print executing unit to print the image on the first sheet paper regardless of whether the target size is the first size or the second size; and
   in a case where the selection information indicates that the second size has been selected as the target size, cause the process executing unit to execute the predetermined process on the first sheet paper,
   wherein in a case where the selection information indicates that the first size has been selected as the target size, the predetermined process is not executed on the first sheet paper.

2. The printer according to claim 1 wherein
   in a case where the second sheet paper is contained in the container unit and the first sheet paper is not contained in the container unit, the controller is configured to send the capability information including the second size information but not including the first size information to the terminal device.

3. The printer according to claim 1, wherein
   in a case where a third sheet paper having a third size different from the first size and the second size is contained in the container unit and the first sheet paper and the second sheet paper are not contained in the container unit, the controller is configured to send the capability information including third size information indicating that the third size is contained but not including the first size information or the second size information to the terminal device.

4. The printer according to claim 1, wherein
   in the case where the first sheet paper is contained in the container unit and the second sheet paper is not contained in the container unit, the capability information includes first related information and second related information,
   the first related information is information in which the first size information and first name information that is a name of the container unit are associated with each other, and
   the second related information is information in which the second size information and second name information that is a name of a virtual container unit which does not actually exist in the printer are associated with each other.

5. The printer according to claim 4, wherein
   the second name information indicates an arbitrary name determined by a vendor of the printer.

6. The printer according to claim 4, wherein
   the second name information indicates a name defined by the Printer Working Group Media Standardized Names 2.0 (PWG MSN 2.0).

7. The printer according to claim 1, wherein
   in a case where the first sheet paper is contained in the container unit, the second sheet paper is not contained in the container unit, and it is selected by a user that the predetermined process is to be executed on the sheet paper, the controller is configured to send the capability information including the first size information and the second size information to the terminal device, and
   in a case where the first sheet paper is contained in the container unit, the second sheet paper is not contained in the container unit, and it is selected by the user that the predetermined process is not to be executed on the sheet paper, the controller is configured to send the capability information including the first size information but not including the second size information to the terminal device.

8. The printer according to claim 7, further comprising a display unit, wherein
   the controller is further configured to:
   cause the display unit to display a selection screen for causing the user to select whether the predetermined process is to be executed on the sheet paper when a size of the sheet paper contained in the container unit is inputted by the user to the printer.

9. The printer according to claim 1, wherein
   the image data represents the image having a size corresponding to the target size, and
   in a case where the selection information and the image data are received from the terminal device and the target size is the second size which is half of the first size, the controller is configured to generate a rotated image obtained by rotating the image by 90 degrees and cause the print executing unit to print the rotated image on the first sheet paper.

10. The printer according to claim 1, wherein
    the predetermined process is any of a process to cut the sheet paper, a process to perforate the sheet paper, and a process to crease the sheet paper.

11. The printer according to claim 1, wherein
    the terminal device comprises a general-purpose printer driver, and the controller is configured to receive the selection information and the image data from the general-purpose printer driver of the terminal device.

12. A non-transitory computer-readable recording medium storing computer-readable instructions for a printer, which comprises:
   a container unit configured to contain a sheet paper;
   a transportation unit configured to transport the sheet paper from the container unit;
   a print executing unit configured to execute printing on the sheet paper;
   a process executing unit configured to execute a predetermined process related to cutting of the sheet paper; and
   a processor, wherein
   the computer-readable instructions, when executed by the processor, cause the printer to:
   in a case where a first sheet paper having a first size is contained in the container unit and a second sheet paper having a second size smaller than the first size is not contained in the container unit, send capability information including first size information indicating that the first size is contained and second size information indicating that the second size is contained to a terminal device;
   after the capability information has been sent to the terminal device, receive image data representing an image to be printed and selection information indicating that a target size which is a size of the sheet paper to be printed has been selected, wherein the selection information was sent in response to a user selecting the target size from among a plurality of sizes including the first size indicated by the first size information and the second size indicated by the second size information;
   in a case where the selection information and the image data are received from the terminal device, cause the transportation unit to transport the first sheet paper and cause the print executing unit to print the image on the first sheet paper regardless of whether the target size is the first size or the second size; and
   in a case where the selection information indicates that the second size has been selected as the target size, cause the process executing unit to execute the predetermined process on the first sheet paper,
   wherein in a case where the selection information indicates that the first size has been selected as the target size, the predetermined process is not executed on the first sheet paper.

* * * * *